US012760781B2

(12) United States Patent
Klimek et al.

(10) Patent No.: US 12,760,781 B2
(45) Date of Patent: Oct. 13, 2026

(54) DOUBLE CHAMFERED HYDRAULIC COMPRESSION STOP SLEEVE

(71) Applicant: BeijingWest Industries Co., Ltd., Beijing (CN)

(72) Inventors: Wojciech Klimek, Cracow (PL); Mateusz Szymon Sarapata, Wysoka (PL)

(73) Assignee: BeijingWest Industries Co., Ltd., Beijing (CN)

( * ) Notice: Subject to any disclaimer, the term of this patent is extended or adjusted under 35 U.S.C. 154(b) by 368 days.

(21) Appl. No.: 18/380,606

(22) Filed: Oct. 16, 2023

(65) Prior Publication Data

US 2024/0280159 A1 Aug. 22, 2024

(30) Foreign Application Priority Data

Feb. 22, 2023 (CN) ........................ 202310188909.3

(51) Int. Cl.
*F16F 9/58* (2006.01)
*F16F 9/16* (2006.01)

(52) U.S. Cl.
CPC . *F16F 9/58* (2013.01); *F16F 9/16* (2013.01)

(58) Field of Classification Search
CPC ...... F16F 9/16; F16F 9/48; F16F 9/483; F16F 9/49; F16F 9/58; F16B 15/22; F16B 15/222; F16B 15/223
See application file for complete search history.

(56) References Cited

U.S. PATENT DOCUMENTS

| | | | | |
|---|---|---|---|---|
| 3,447,644 A * | 6/1969 | Duckett | F16F 9/48 188/315 |
| 9,605,726 B2 * | 3/2017 | Baldoni | F16F 9/49 |
| 9,657,803 B2 * | 5/2017 | Slusarczyk | B21D 22/20 |
| 10,107,352 B2 * | 10/2018 | Grzesik | F16F 9/585 |
| 10,876,591 B2 * | 12/2020 | Mallin | F16F 9/5126 |

(Continued)

FOREIGN PATENT DOCUMENTS

| | | |
|---|---|---|
| CN | 106949182 A | 7/2017 |
| CN | 107208726 A | 9/2017 |

(Continued)

OTHER PUBLICATIONS

Extended Search Report issued on Jul. 18, 2024 for counterpart European patent application No. 24158619.7.

(Continued)

*Primary Examiner* — Vishal R Sahni
(74) *Attorney, Agent, or Firm* — Dickinson Wright PLLC

(57) ABSTRACT

A damper assembly with a hydraulic compression stop (HCS) includes a tube defining an interior chamber. The damper assembly also includes a piston assembly slidably disposed in the tube. The piston assembly includes an HCS piston. The HCS piston includes a piston extension with a piston ring disposed thereupon. The damper assembly also includes an HCS sleeve. The HCS sleeve includes an HCS body having a tubular shape and defining a chamfer opening for receiving the HCS piston. The HCS body defines a plurality of ribs extending radially inwardly from the chamfer opening and configured to guide the HCS piston apart from the chamfer opening as the HCS piston enters the HCS sleeve.

16 Claims, 7 Drawing Sheets

(56) References Cited

U.S. PATENT DOCUMENTS

| | | | | |
|---|---|---|---|---|
| 11,181,161 | B2 * | 11/2021 | Baldoni | F16F 9/19 |
| 11,187,298 | B2 * | 11/2021 | Mallin | F16F 9/49 |
| 11,668,367 | B2 * | 6/2023 | Kasprzyk | F16F 9/185 188/284 |
| 2008/0053765 | A1 | 3/2008 | Tomonaga et al. | |
| 2009/0223759 | A1 | 9/2009 | Kim | |
| 2012/0090931 | A1 * | 4/2012 | Krazewski | F16F 9/3465 188/288 |
| 2014/0360353 | A1 | 12/2014 | Baalmann et al. | |
| 2015/0330475 | A1 | 11/2015 | Slusarczyk et al. | |
| 2016/0223045 | A1 * | 8/2016 | Baldoni | F16F 9/48 |
| 2016/0230835 | A1 | 8/2016 | Groves et al. | |
| 2017/0314636 | A1 | 11/2017 | Grzesik et al. | |
| 2017/0328438 | A1 | 11/2017 | BeijingWest | |
| 2018/0058533 | A1 | 3/2018 | Bruno et al. | |
| 2018/0223942 | A1 | 8/2018 | Kus et al. | |
| 2019/0353221 | A1 | 11/2019 | Hertz et al. | |
| 2020/0256420 | A1 | 8/2020 | Mallin et al. | |
| 2021/0131519 | A1 | 5/2021 | Mallin | |
| 2021/0207678 | A1 | 7/2021 | Bielak, II | |
| 2021/0404528 | A1 | 12/2021 | Kasprzyk et al. | |

FOREIGN PATENT DOCUMENTS

| | | | | |
|---|---|---|---|---|
| CN | 111601982 | A | 8/2020 | |
| CN | 112128288 | A1 | 12/2020 | |
| CN | 112855829 | A1 | 5/2021 | |
| DE | 29910104 | U1 | 7/2000 | |
| DE | 102014223480 | A1 | 5/2016 | |
| DE | 102015121140 | A1 | 6/2017 | |
| DE | 102019206510 | A1 | 11/2020 | |
| EP | 3176464 | A | 6/2017 | |
| EP | 3239556 | A1 | 11/2017 | |
| EP | 3358213 | A1 | 8/2018 | |
| EP | 3358213 | B1 * | 11/2019 | B60G 17/08 |
| GB | 1132038 | A | 10/1968 | |
| JP | 2016003675 | A | 1/2016 | |
| KR | 20040091464 | A | 10/2004 | |
| KR | 20100055045 | A | 5/2010 | |
| WO | 2013092084 | A1 | 6/2013 | |
| WO | 2016146660 | A1 | 9/2016 | |
| WO | 2019233927 | A1 | 12/2019 | |

OTHER PUBLICATIONS

First Office Action and Search Report issued on Apr. 22, 2026, for counterpart Chinese patent application No. 202310188909.3 with machine EN translation downloaded from EPO (18 pages).

* cited by examiner

DOUBLE CHAMFERED HYDRAULIC COMPRESSION STOP SLEEVE

CROSS-REFERENCE TO RELATED APPLICATIONS

This applications claims priority to Chinese Patent Application No. 202310188909.3, filed on Feb. 22, 2023, which is hereby incorporated by reference in its entirety.

BACKGROUND OF THE INVENTION

1. Field of the Invention

The present disclosure generally relates to a hydraulic compression stop sleeve of a damper assembly. More specifically, the present disclosure relates to a hydraulic compression stop sleeve for a damper assembly for a vehicle.

2. Description of the Prior Art

Damper assemblies are well known in the art for use in a vehicle. Vehicle suspension systems are designed to absorb the shock caused by uneven driving surfaces. Damper assemblies assist the suspension system by capturing vibrations between the wheels and the vehicle body. Dampers typically work in tandem with a spring, where the damper absorbs the excess force, the spring may transfer to the vehicle body. On bumpy roads, especially on a curve, the vibrations of the vehicle body become serious enough to cause a driver to lose control of the vehicle. The damper assemblies dampen out the mainspring oscillations once the wheel has passed the bumpy area. The spring energy is converted to heat and dissipated by the dampers. Early dampers were merely cylinders filled with oil or gas; damper designs have improved since.

In some designs, a damper assembly may provide enhanced damping properties using a hydraulic compression stop arrangement that generates additional damping force over a predefined end section of an operating travel range of the piston rod. Exemplary dampers provided with such hydraulic compression stop arrangements are disclosed in patent publications. The hydraulic compression stop arrangements permit progressive generation of additional damping force depending not only on a piston assembly position but also on its velocity within the predefined end section, which may be tunable.

SUMMARY OF THE INVENTION

The present invention provides a hydraulic compression stop (HCS) sleeve for a damper assembly. The HCS sleeve includes an HCS body having a tubular shape and defining a chamfer opening for receiving an HCS piston. The HCS body defines a plurality of ribs extending radially inwardly from the chamfer opening and configured to progressively guide the HCS piston apart from the chamfer opening as the HCS piston enters the HCS sleeve.

The present invention also provides a damper assembly with a hydraulic compression stop (HCS). The damper assembly includes a tube defining an interior chamber. The damper assembly also includes a piston assembly slidably disposed in the tube. The piston assembly includes an HCS piston. The HCS piston includes a piston extension with a piston ring disposed thereupon. The damper assembly also includes an HCS sleeve. The HCS sleeve includes an HCS body having a tubular shape and defining a chamfer opening for receiving the HCS piston. The HCS body defines a plurality of ribs extending radially inwardly from the chamfer opening and configured to guide the HCS piston apart from the chamfer opening as the HCS piston enters the HCS sleeve.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views. The present disclosure provides a damper assembly with a hydraulic compression stop (HCS) with an HCS sleeve that is configured to generate a progressive increase of high damping force and to thereby prevent or dampen a sudden increase in compressive force that may otherwise be produced when the HCS is activated. The HCS sleeve of the present disclosure may provide several advantages over conventional HCS sleeves, such as a reduction peak force generated. It requires changing a geometry only one component (i.e. the HCS sleeve). The HCS sleeve of the present disclosure may provide manufacturing advantages over alternative solutions. For example, the HCS sleeve of the present disclosure may be manufactured using a pull broaching process and without any additional machining.

Figure 1:
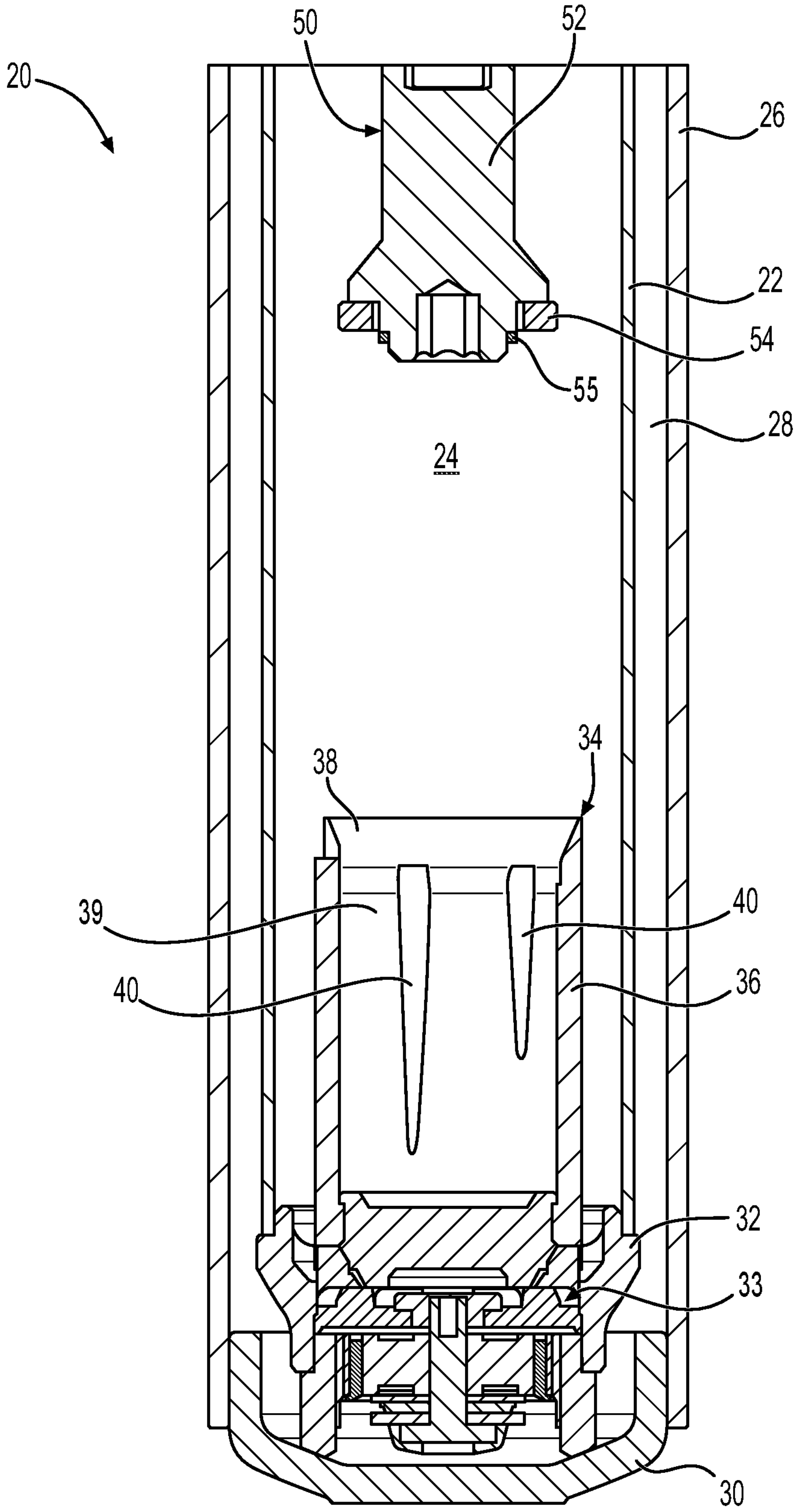
FIG. 1 shows a fragmentary cross-sectional view of a damper with a hydraulic compression stop (HCS) assembly.

FIG. 1 shows a fragmentary cross-sectional view of a damper assembly 20 with a hydraulic compression stop (HCS). The damper assembly 20 may be used as a shock absorber in a suspension system of a motor vehicle, such as a passenger car or truck.

The damper assembly 20 has a twin-tube configuration including an inner tube 22 disposed within and coaxially with an outer tube 26. The inner tube 22 defines an interior chamber 24 in which a piston assembly 50 is slidably disposed. The piston assembly 50 includes a HCS piston 52,

54, 55 having a piston extension 52 and a HCS piston ring 54. The HCS piston 52, 54, 55 also includes a retaining ring 55 that secures the HCS piston ring 54 to the piston extension 52. The piston assembly 50 may include other components (not shown in FIG. 1), such as seals and valves that regulate fluid flow through the interior chamber 24 as the piston assembly 50 moves therethrough.

The inner tube 22 further defines a compensation chamber 28 extending annularly between the inner tube 22 and the outer tube 26. An end cap 30 seals an end of the outer tube 26. An HCS adapter 32 is mounted to the inner tube 22 at an axial end thereof adjacent to the end cap 30. A base valve 33 is mounted to the HCS adapter 32 and is configured to restrict fluid flow between the interior chamber 24 and the compensation chamber 28.

The damper assembly 20 includes a first HCS assembly 34, 52, 54, 55 that includes a first HCS sleeve 34. The first HCS sleeve 34 is mounted to the HCS adapter 32 and receives the HCS piston 52, 54, 55 when the piston assembly 50 approaches the HCS adapter 32 during a compression stroke. The first HCS assembly 34, 52, 54, 55 thereby generates an increased compressive force near an end of the compression stroke of the damper assembly 20.

The first HCS sleeve 34 includes a first HCS body 36 having a tubular shape and defining a first chamfer opening 38 for receiving the HCS piston 52, 54, 55. The HCS body 36 includes a first cylindrical inner surface 39 having a cylindrical shape and defining a plurality of first grooves 40 extending axially therein. The first grooves 40 have an arcuate cross section with a depth that gets progressively shallower along a length away from the first chamfer opening 38. The first grooves 40 conduct fluid out of the first HCS body 36 as the HCS piston 52, 54, 55 is moved into the first HCS sleeve 34 during the compression stroke.

Figure 2:
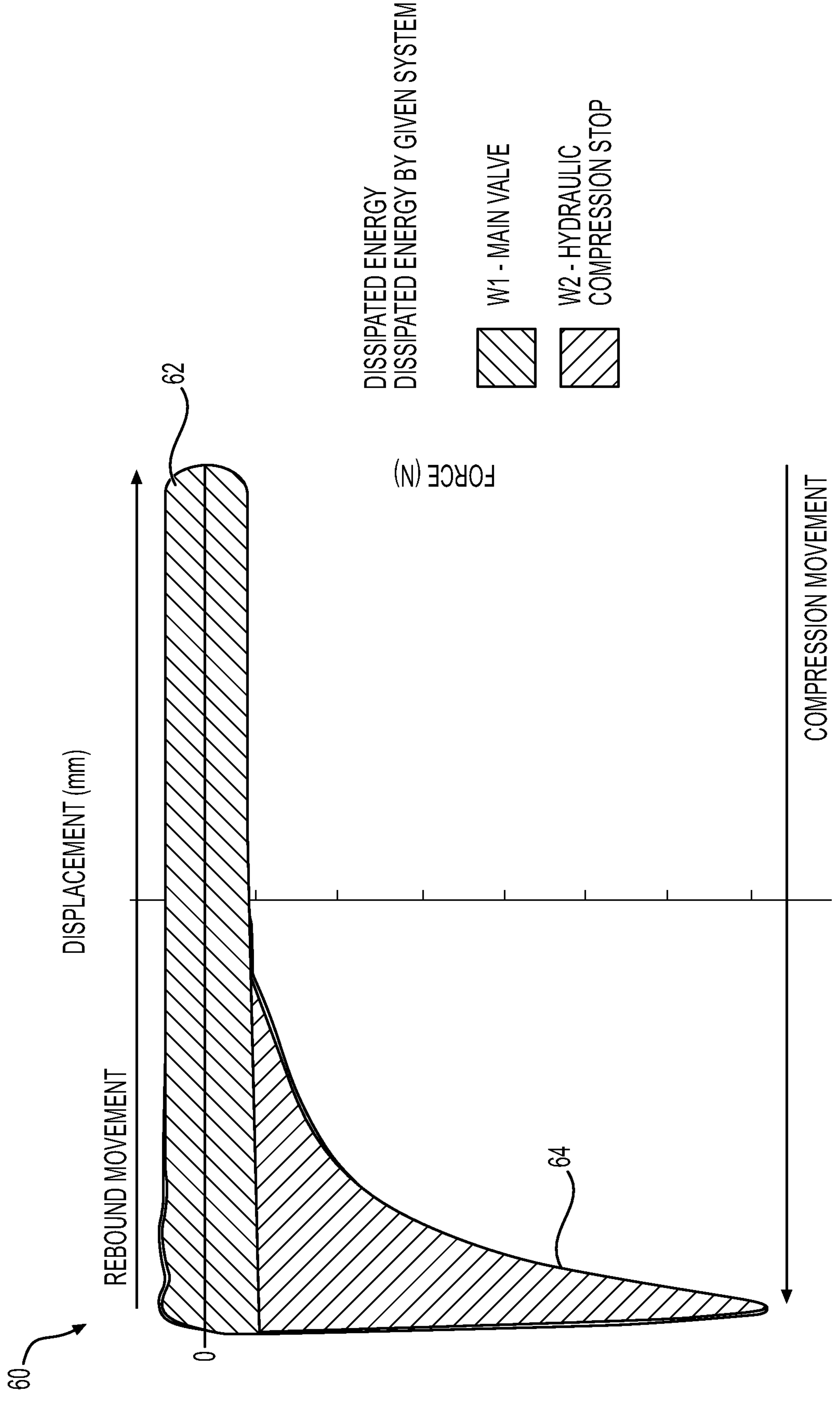
FIG. 2 shows a graph of force vs. displacement of the damper equipped with the HCS assembly of the present disclosure.

FIG. 2 shows a graph 60 of force vs. displacement of the damper assembly 20 of FIG. 1. The graph 60 includes a first plot 62 showing standard damping forces produced by a main valve (i.e. the base valve 33 and/or other valves in the piston assembly 50) that is consistent through the displacement range and which is approximately equal in both the compression and rebound movement directions. The graph 60 also shows a second plot 64 that illustrates increased compression force generated by the first HCS assembly 34, 52, 54, 55 in the compression direction and in a region adjacent to an end of compression movement displacement, which may be called an HCS active region, and which corresponds to the HCS piston 52, 54, 55 moving within the first HCS sleeve 34.

Figure 3B:
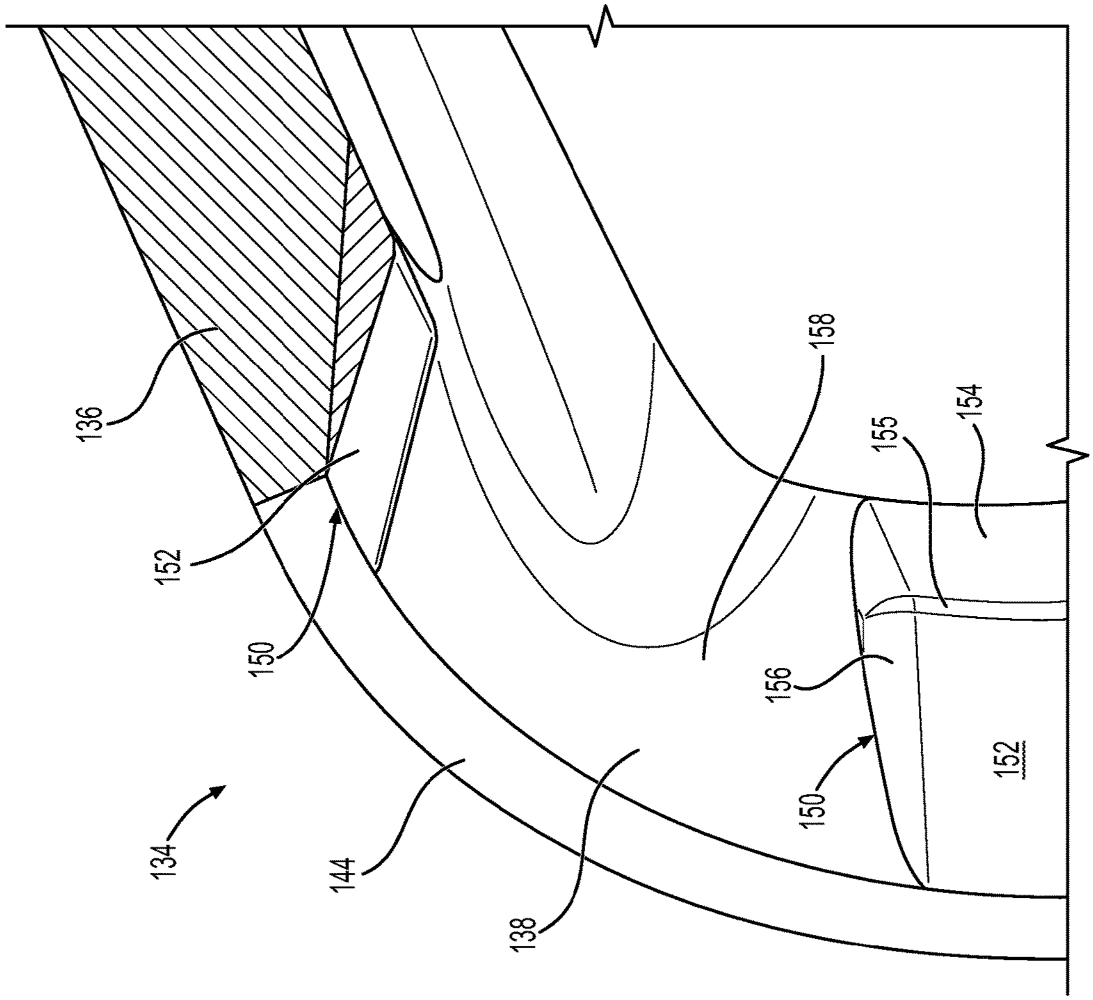
FIG. 3B shows an enlarged fragmentary perspective cross-sectional view of the HCS sleeve of FIG. 3A
Figure 3A:
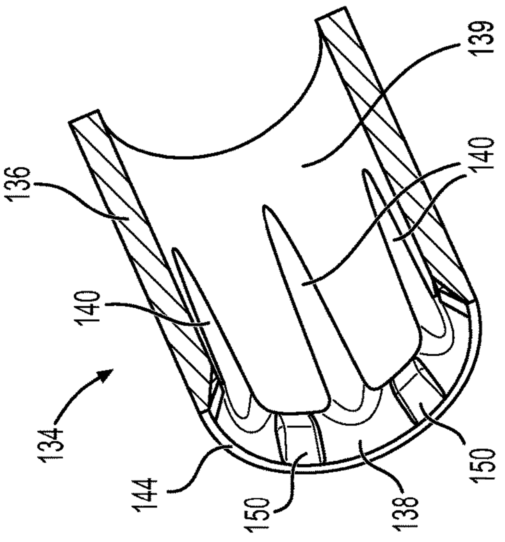
FIG. 3A shows a perspective cross-sectional view of a HCS sleeve of the present disclosure.

FIGS. 3A-3B show a second HCS sleeve 134 in accordance with the present disclosure. The second HCS sleeve 134 may be similar to the first HCS sleeve 34 and serve a similar function in a HCS assembly of a damper, such as a shock absorber for a motor vehicle. The second HCS sleeve 134 includes a second HCS body 136 having a tubular shape and defining a second chamfer opening 138 for receiving the HCS piston 52, 54, 55. The second HCS body 136 includes a second cylindrical inner surface 139 having a cylindrical shape and defining a plurality of second grooves 140 extending axially therein. The second grooves 140 have an arcuate cross section with a depth that gets progressively shallower along a length away from the second chamfer opening 138. The second grooves 140 conduct fluid out of the second HCS body 136 as the HCS piston 52, 54, 55 is moved into the second HCS sleeve 134 during the compression stroke. The second HCS body 136 defines an annular rim 144 having a flat surface extending perpendicular to an axis of the tubular shape, with the second chamfer opening 138 sloping inwardly from the annular rim 144 to the second cylindrical inner surface 139.

The second HCS body 136 also defines a plurality of ribs 150 that extend radially inwardly from the second chamfer opening 138 and which are configured to progressively guide the HCS piston ring 54 apart from the second chamfer opening 138 as the HCS piston 52, 54, 55 enters the second HCS sleeve 134. The ribs 150 are configured to create a gap 158 between the HCS piston 52, 54, 55 and the second HCS body 136, and which gets progressively smaller as the HCS piston 52, 54, 55 enters the second HCS sleeve 134. Thus, the ribs 150 reduce or eliminate a sudden increase in compressive force that may otherwise be generated by the HCS piston 52, 54, 55 entering and sealing against the second HCS sleeve 134

The second HCS body 136 includes six (6) of the ribs 150 spaced apart from one another at regular angular intervals (i.e. with 60-degree spacing between the ribs 150). However, a different number of the ribs 150 and/or a different spacing between the ribs 150 may be used.

In some embodiments, and as shown in the Figures, each of the ribs 150 is circumferentially spaced between two adjacent ones of the second grooves 140 to define an alternating pattern of the second grooves 140 and the ribs 150 around an inner circumference of the second HCS body 136. However, it should be appreciated that a different pattern or arrangement of the second grooves 140 and the ribs 150 may be used, depending on design requirements for a particular application.

Each of the ribs 150 may have a similar or identical design. Alternatively, the ribs 150 may have two or more different designs or geometries. Referring to FIG. 3B, which shows one of the ribs 150 in detail, the rib 150 include a sloped surface 152 located adjacent to the annular rim 144 and facing out of the second HCS body 136 and toward the HCS piston 52, 54, 55 with the HCS piston 52, 54, 55 located outside of the second HCS sleeve 134 (i.e. before the HCS is activated in a compression stroke). The rib 150 also includes a lower surface 154 adjacent to the sloped surface 152 and extending generally parallel to the second cylindrical inner surface 139 of the second HCS body 136. The rib 150 also includes a knee 155 having a gradual curvature between the sloped surface 152 and the lower surface 154. The rib 150 also includes a side edge 156 that curves outwardly from the sloped surface 152 and the lower surface 154 to meet the second chamfer opening 138. FIG. 3B also illustrates the gap 158 between two adjacent ones of the ribs 150 and which overlies the second chamfer opening 138 of the second HCS sleeve 134.

Figure 4:
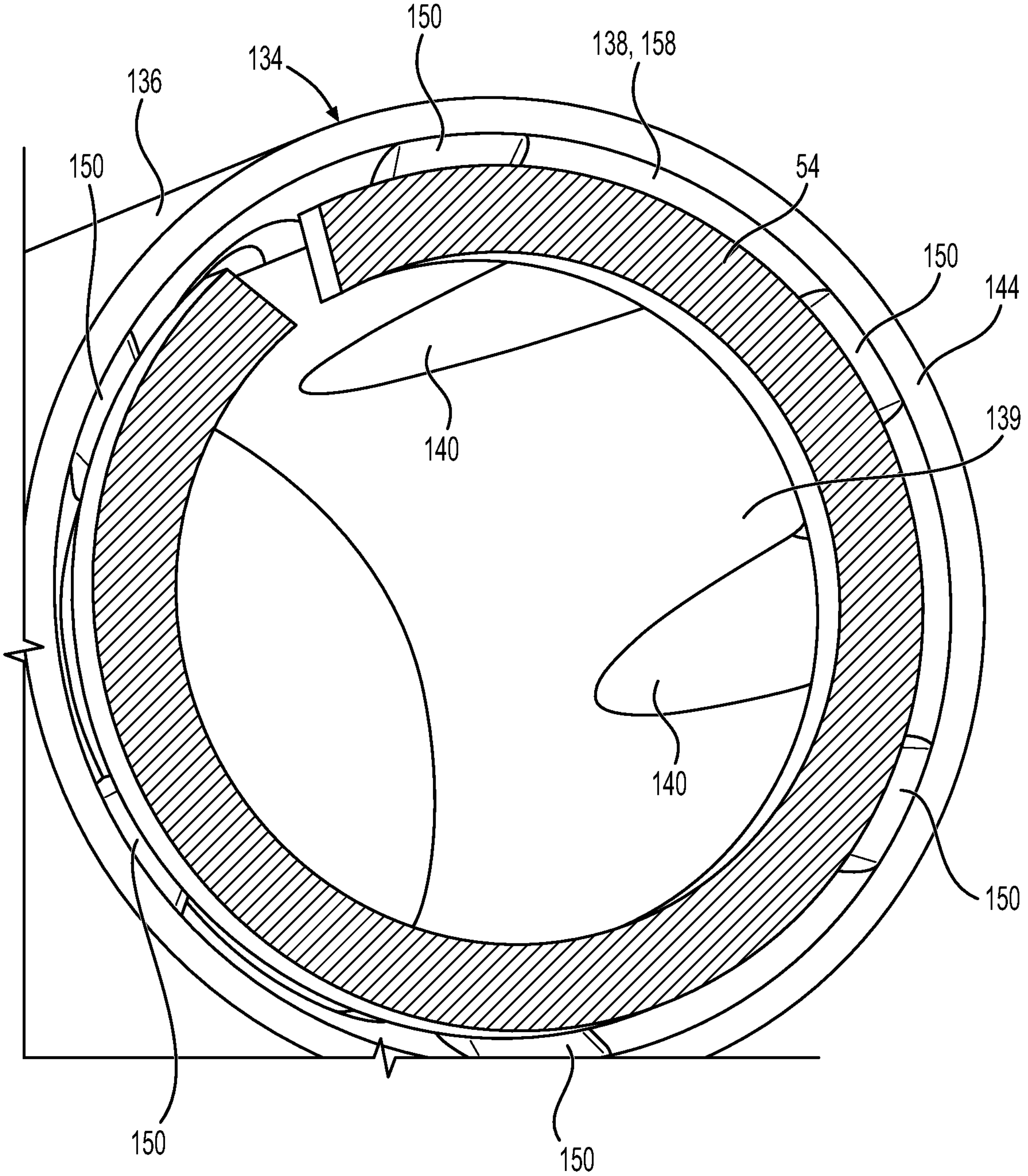
FIG. 4 shows a perspective view of an HCS piston ring engaging a plurality of ribs of the HCS sleeve of the present disclosure.

FIG. 4 shows a perspective view of an HCS piston ring 54 engaging a plurality of ribs 150 of the second HCS sleeve 134, with adjacent sets of the ribs 150 defining the gaps 158 therebetween for transmitting fluid therethrough as the HCS piston 52, 54, 55 enters the second HCS sleeve 134. For illustrative purposes, the piston extension 52 of the HCS piston 52, 54, 55 is not shown on FIG. 4.

Figure 5A:
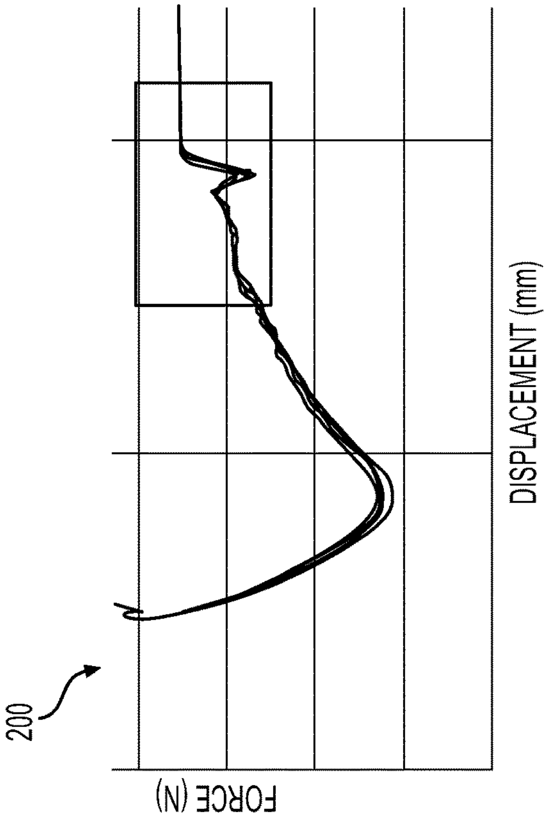
FIG. 5A shows a graph of force vs. displacement for a damper with a conventional HCS sleeve.
Figure 5B:
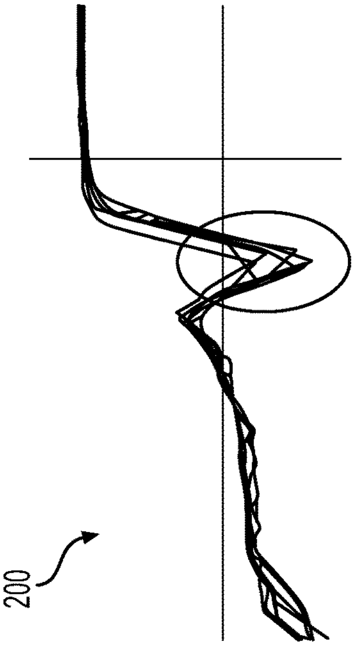
FIG. 5B shows an enlarged portion of the graph of FIG. 5A.
Figure 5C:
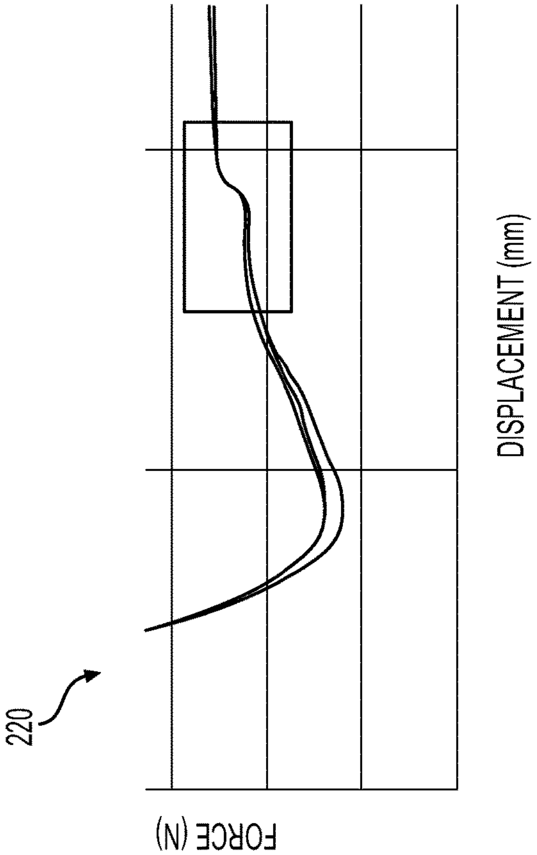
FIG. 5C shows a graph of force vs. displacement for a damper with the HCS sleeve of the present disclosure.
Figure 5D:
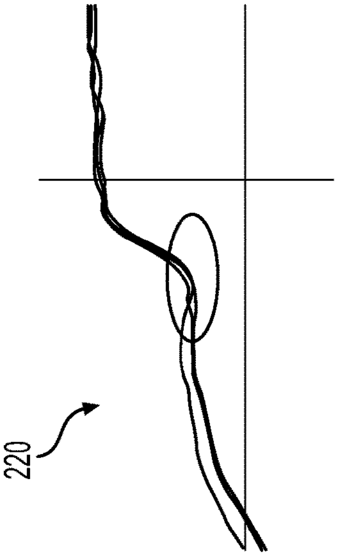
FIG. 5D shows an enlarged portion of the graph of FIG. 5C.

FIG. 5A shows a graph 200 of force vs. displacement for a damper with a conventional HCS sleeve, such as the first HCS sleeve 34. FIG. 5B shows an enlarged portion of the graph of FIG. 5A. FIG. 5C shows a graph 220 of force vs. displacement for a damper with second HCS sleeve 134. FIG. 5D shows an enlarged portion of the graph of FIG. 5C. As illustrated in the graphs 200, 220, the second HCS sleeve 134 of the present disclosure, which includes the plurality of ribs 150, dramatically reduces a sudden increase in compressive force that may otherwise be generated when the HCS piston 52, 54, 55 enters the HCS sleeve 34, 134. The sudden increase in HCS force may otherwise cause jarring deceleration of the damper. By limiting the sudden increase in compressive force, the second HCS sleeve 134 may be made of a molded material that is less expensive and easier to manufacture when compared with other materials, such as steel, that may be required to withstand forces generated in a damper with the first HCS sleeve 34.

Figure 6:
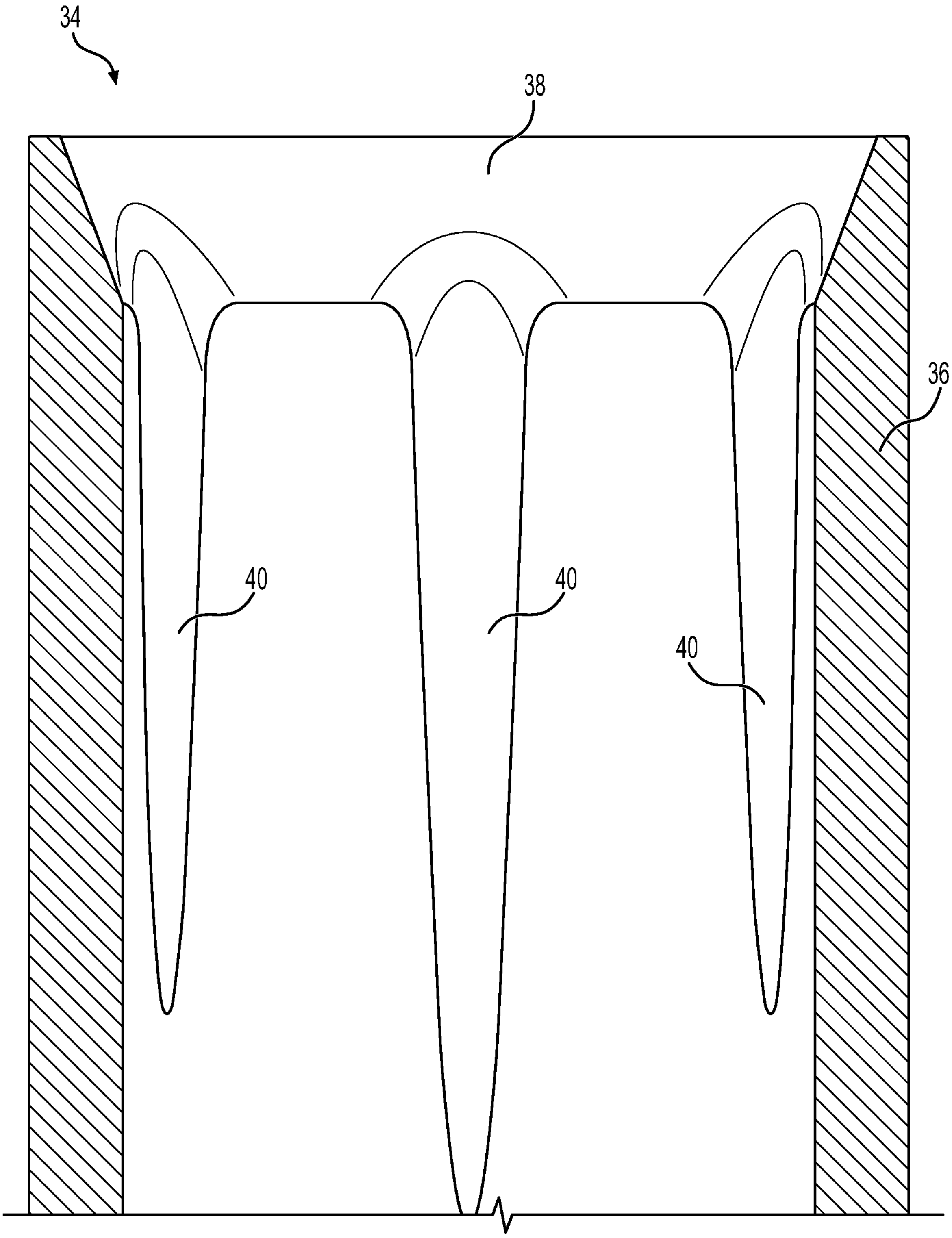
FIG. 6 shows a cross-sectional view of the conventional HCS sleeve.
Figure 7:
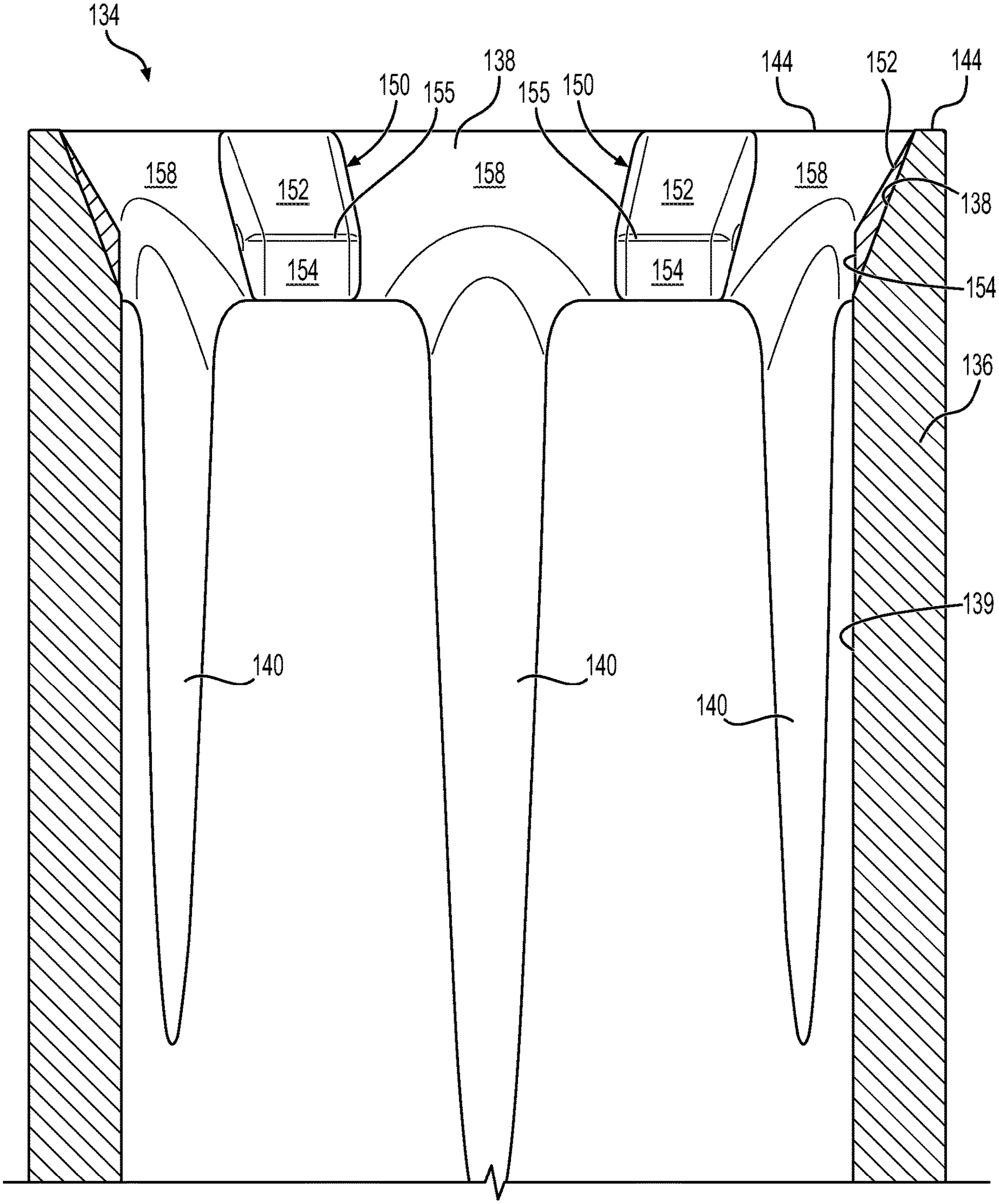
FIG. 7 shows a cross-sectional view of the HCS sleeve of the present disclosure.

FIG. 6 shows a cross-sectional view of the first HCS sleeve 34, and FIG. 7 shows a cross-sectional view of the second HCS sleeve 134. As best shown in FIG. 7, the second chamfer opening 138 has a frustoconical shape that defines a taper angle with a constant slope between the annular rim 144 and the second cylindrical inner surface 139 of the second HCS body 136. In other words, and as shown in profile on FIG. 7, the second chamfer opening 138 extends in straight line between the annular rim 144 and the second cylindrical inner surface 139. Additionally, FIG. 7 shows the sloped surface 152 of one of the ribs 150 defining an angle that is shallower than the taper angle of the second chamfer opening 138. FIG. 7 also shows the lower surface 154 of one of the ribs 150 extending parallel to the second cylindrical inner surface 139. FIG. 7 shows the lower surface 154 being slightly recessed (i.e. radially outwardly) from the second cylindrical inner surface 139 of the second HCS body 136. However, the lower surface 154 of one or more of the ribs 150 may be directly aligned with the second cylindrical inner surface 139 of the second HCS body 136.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A hydraulic compression stop (HCS) sleeve for a damper assembly, comprising:

an HCS body having a tubular shape and defining a chamfer opening for receiving an HCS piston, the HCS body defining a plurality of ribs extending radially inwardly from the chamfer opening and configured to progressively guide the HCS piston apart from the chamfer opening as the HCS piston enters the HCS sleeve, wherein at least one rib of the plurality of ribs defines a sloped surface facing out of the HCS body and toward the HCS piston with the HCS piston outside of the HCS sleeve, and includes a lower surface adjacent to the sloped surface and extending generally parallel to a cylindrical inner surface of the HCS body, wherein the at least one rib is located at the chamfer opening, wherein the HCS body has a variable thickness at the chamfer opening, the chamfer opening sloping inwardly from an annular rim of the HCS body to a cylindrical inner surface of the HCS body.

2. The HCS sleeve of claim 1, wherein the plurality of ribs are spaced apart from one another at regular angular intervals.

3. The HCS sleeve of claim 1, wherein the HCS body includes an interior surface defining a plurality of grooves extending axially therein, and wherein each rib of the plurality of ribs is circumferentially spaced between two adjacent grooves of the plurality of grooves.

4. The HCS sleeve of claim 1, wherein the tubular shape of the HCS body includes the annular rim, and wherein the sloped surface of the at least one rib is adjacent to the annular rim of the HCS body.

5. The HCS sleeve of claim 1, wherein the tubular shape of the HCS body includes the annular rim, and the chamfer opening defines a taper angle between the annular rim and the cylindrical inner surface of the HCS body, and wherein the sloped surface of the at least one rib defines an angle that is shallower than the taper angle of the chamfer opening.

6. The HCS sleeve of claim 5, wherein the taper angle of the chamfer opening defines a constant slope between the annular rim and the cylindrical inner surface of the HCS body.

7. The HCS sleeve of claim 1, wherein the at least one rib includes a knee having a gradual curvature between the sloped surface and the lower surface.

8. The HCS sleeve of claim 1, wherein the plurality of ribs includes six of the ribs.

9. A damper assembly with a hydraulic compression stop (HCS), comprising:

a tube defining an interior chamber;

a piston assembly slidably disposed in the tube and including an HCS piston including a piston extension with a piston ring disposed thereupon; and an HCS sleeve including an HCS body having a tubular shape and defining a chamfer opening for receiving the HCS piston, the HCS body defining a plurality of ribs extending radially inwardly from the chamfer opening and configured to guide the HCS piston apart from the chamfer opening as the HCS piston enters the HCS sleeve, wherein at least one rib of the plurality of ribs defines a sloped surface facing out of the HCS body and toward the HCS piston with the HCS piston outside of the HCS sleeve, and includes a lower surface adjacent to the sloped surface and extending generally parallel to a cylindrical inner surface of the HCS body, wherein the at least one rib is located at the chamfer opening, wherein the HCS body has a variable thickness at the chamfer opening, the chamfer opening sloping inwardly from an annular rim of the HCS body to a cylindrical inner surface of the HCS body.

10. The damper assembly of claim 9, wherein the plurality of ribs are spaced apart from one another at regular angular intervals.

11. The damper assembly of claim 9, wherein the HCS body includes an interior surface defining a plurality of grooves extending axially therein, and wherein each rib of the plurality of ribs is circumferentially spaced between two adjacent grooves of the plurality of grooves.

12. The damper assembly of claim 9, wherein the tubular shape of the HCS body includes the annular rim, and wherein the sloped surface of the at least one rib defines is adjacent to the annular rim of the HCS body.

13. The damper assembly of claim 9, wherein the tubular shape of the HCS body includes the annular rim, and the chamfer opening defines a taper angle between the annular rim and the cylindrical inner surface of the HCS body, and wherein the sloped surface defines an angle that is shallower than the taper angle of the chamfer opening.

14. The damper assembly of claim 13, wherein the taper angle of the chamfer opening defines a constant slope between the annular rim and the cylindrical inner surface of the HCS body.

15. The damper assembly of claim 9, wherein the at least one rib includes a knee having a gradual curvature between the sloped surface and the lower surface.

16. The damper assembly of claim 9, wherein the plurality of ribs includes six of the ribs.

* * * * *